United States Patent
Balakrishnan et al.

(10) Patent No.: US 7,240,240 B2
(45) Date of Patent: Jul. 3, 2007

(54) MANAGING PROCESS STATE INFORMATION IN AN OPERATING SYSTEM ENVIRONMENT

(75) Inventors: Thirumalpathy Balakrishnan, Santa Clara, CA (US); Artem Belevich, Sunnyvale, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 140 days.

(21) Appl. No.: 11/081,297

(22) Filed: Mar. 16, 2005

(65) Prior Publication Data

US 2005/0210077 A1    Sep. 22, 2005

Related U.S. Application Data

(60) Provisional application No. 60/554,036, filed on Mar. 17, 2004.

(51) Int. Cl.
*G06F 11/00* (2006.01)
(52) U.S. Cl. .............................................. 714/15; 714/4
(58) Field of Classification Search ................ 714/15, 714/16, 17, 4
See application file for complete search history.

(56) References Cited

U.S. PATENT DOCUMENTS

| | | | | |
|---|---|---|---|---|
| 5,339,406 A | * | 8/1994 | Carney et al. | 714/45 |
| 5,999,933 A | * | 12/1999 | Mehta | 707/100 |
| 6,094,530 A | * | 7/2000 | Brandewie | 717/127 |
| 6,202,090 B1 | | 3/2001 | Simone | |
| 6,226,761 B1 | * | 5/2001 | Berstis | 714/37 |
| 6,437,788 B1 | * | 8/2002 | Milot et al. | 345/552 |
| 6,523,141 B1 | * | 2/2003 | Cantrill | 714/48 |
| 6,601,184 B1 | | 7/2003 | Clark et al. | |
| 6,681,348 B1 | | 1/2004 | Vachon | |
| 6,769,077 B2 | | 7/2004 | Vachon et al. | |
| 6,832,266 B1 | * | 12/2004 | Shaylor | 719/328 |
| 2002/0194525 A1 | * | 12/2002 | Mathiske et al. | 714/5 |

\* cited by examiner

*Primary Examiner*—Dieu-Minh Le (57) ABSTRACT

A technique for managing process state information involves pushing process state information from the kernel space to the user space in the event of an application crash and generating a core file at the user level instead of at the kernel level. Handling the process state information at the user level instead of at the kernel level provides more flexibility in the generation and management of a core file as compared to systems that use kernel code to generate and manage the core file. A core dump application at the user level can be programmed to forward the core file to another system that has permanent storage capacity available. Additionally, the core dump application can be programmed to compress the process state information and/or to extract only certain information from the process state information while generating the core file.

14 Claims, 6 Drawing Sheets

MANAGING PROCESS STATE INFORMATION IN AN OPERATING SYSTEM ENVIRONMENT

CROSS REFERENCE TO RELATED APPLICATIONS

This application is entitled to the benefit of provisional U.S. Patent Application Ser. No. 60/554,036, filed 17 Mar. 2004.

FIELD OF THE INVENTION

The invention relates generally to computer operating systems, and more particularly, to techniques for managing process state information in an operating system environment.

BACKGROUND OF THE INVENTION

One of the features of UNIX-like operating systems is process address space protection. Basically, all applications (i.e., processes) run in their own address space and any attempt made by an application to access address space that does not belong to the application (i.e., a memory-address violation) results in abnormal termination of the application. Abnormal termination of an application may also result from an illegal instruction, a bus error, or a user-generated quit signal. Upon the abnormal termination of an application, a device within the kernel of the operating system causes process state information to be written or "dumped" to a local permanent storage device. The file that is written to the local permanent storage device is typically named "core" or "<programname>.core" and is generally referred to as the "core file" or just the "core." The process of saving the core file to a local permanent storage device is often referred to as a "core dump" or a "crash dump."

In prior art operating systems, the kernel of the operating system includes a core dump device that generates the core file and stores the core file in the local permanent storage device. The core dump device may store the core file in flash memory, a hard disk, or a removable storage device. Having the core file generated by the kernel and relying on the kernel to store the core file in a local permanent storage device works well in systems where there is plenty of local storage capacity available. However, in many computer systems such as networking equipment (e.g., routers and switches), embedded systems (e.g., bioelectronic devices, telephone voice switches, aircraft controllers), and appliances (e.g., robots, mobile communications devices), local permanent storage capacity is limited. In particular, many such systems do not have enough flash memory capacity or a large local storage device such as a hard disk or removable storage media that can be used to store the core file. Although the permanent storage capacity in these types of computer systems is limited, it is still desirable to be able to generate and save a core file so that application crashes can be debugged.

In view of this, what is needed is a technique for managing process state information that is flexible and that can be applied to computer systems with limited local storage capacity.

SUMMARY OF THE INVENTION

A technique for managing process state information involves pushing process state information from the kernel space to the user space in the event of an application crash and generating a core file at the user level instead of at the kernel level. Handling the process state information at the user level instead of at the kernel level provides more flexibility in the generation and management of a core file as compared to systems that use kernel code to generate and manage the core file. A core dump application at the user level can be programmed to forward the core file to another system that has permanent storage capacity available. Additionally, the core dump application can be programmed to compress the process state information and/or to extract only certain information from the process state information while generating the core file.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

Figure 1:
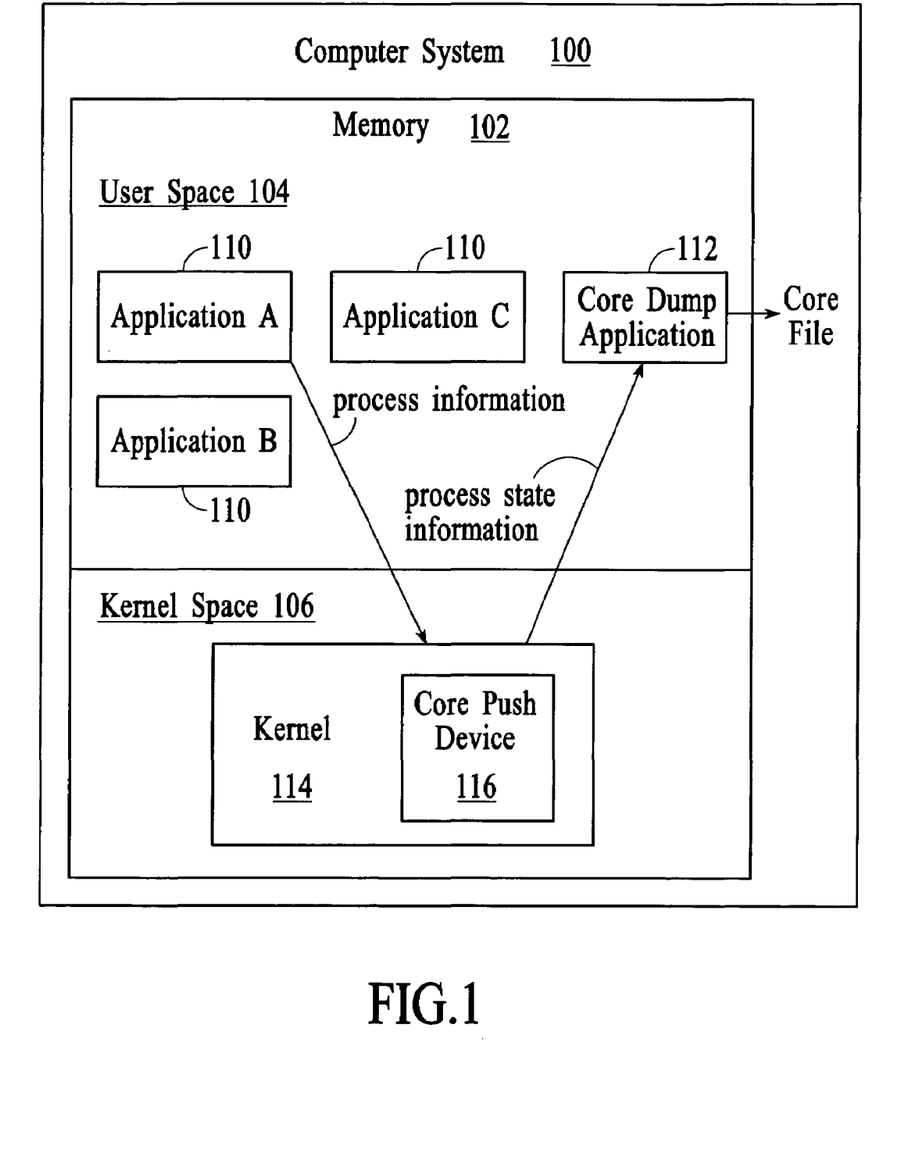
FIG. 1 depicts a computer system that runs an operating system, with the computer system including a core push device at the kernel level and a core dump application at the user level.

FIG. 1 depicts a computer system 100 that runs an operating system. The computer system includes memory 102 that is logically divided into user space 104 and kernel space 106. In the embodiment of FIG. 1, the memory is volatile memory such as random access memory (RAM).

The user space 104 is reserved for running applications. The applications run at the user level and may include any applications that perform a useful function upon execution. In the example of FIG. 1, the applications include applications A, B, and C 110 and a core dump application 112. The particular functions of applications A, B, and C are not critical to the invention. The function of the core dump application is described in more detail below.

The kernel space 106 is reserved for running the kernel 114 of the operating system. As is known in the field, the kernel is the portion of the operating system code that performs the core services of the operating system, including, for example, memory management, process management, and inter-process communications. The kernel depicted in FIG. 1 includes a core push device 116, which is described in more detail below.

For description purposes, an application that is being executed is called a process. The contents of the memory 102 in the user space 104 that corresponds to a process is referred to as the process information. Process information may include state information stored in the kernel, process stack information, data area (e.g., the process data section), and memory mapped regions. The information stored in the kernel space 106 that corresponds to a process is referred to as process state information. Process state information may include stack pointers, routine variables, loaded operating instructions, register addresses, process stack, data area, and memory mapped regions.

In typical operating systems, the kernel includes a core dump device that generates a core file in response to an application fault and saves the core file to a local permanent storage device such as flash memory, a local hard disk, or a removable storage media. This technique works well as long as there is enough local permanent storage capacity available to store the core file. If there is not enough local permanent storage capacity available to store the core file, the core file may be truncated or simply not generated. In accordance with the invention, the core push device 116 from FIG. 1 pushes process state information up to the user space 104 in the event of a fault during execution of an application and the core dump application 112 from FIG. 1 generates the core file at the user level. Handling the process state information at the user level instead of at the kernel level provides more flexibility in the generation and management of the core file as compared to systems that use kernel code to generate and manage the core file. A core dump application at the user level can be programmed to forward the core file to another system that has permanent storage capacity available. Additionally, the core dump application can be programmed to compress the process state information and/or to extract only certain information from the process state information while generating the core file.

The basic operation of generating a core file is now described in more detail with reference to FIGS. 1 and 2. Referring to FIG. 1, it is assumed that application A 110 is being executed. In the course of executing application A, process information is generated at the user level and communicated to the kernel level and process state information is generated at the kernel level. If a fault condition occurs during execution of application A (i.e., an application crash), the core push device 116 is activated and pushes process state information from the kernel space 106 up to the user space 104. In particular, process state information is pushed directly from the kernel space to the user space without first being stored in a local permanent storage device. Once the process state information is pushed to the user space, the core dump application 112 generates a core file from the pushed process state information. The core dump application can then forward the core file, or a copy thereof, to a location where it can be permanently stored and accessed for debugging.

Figure 2:
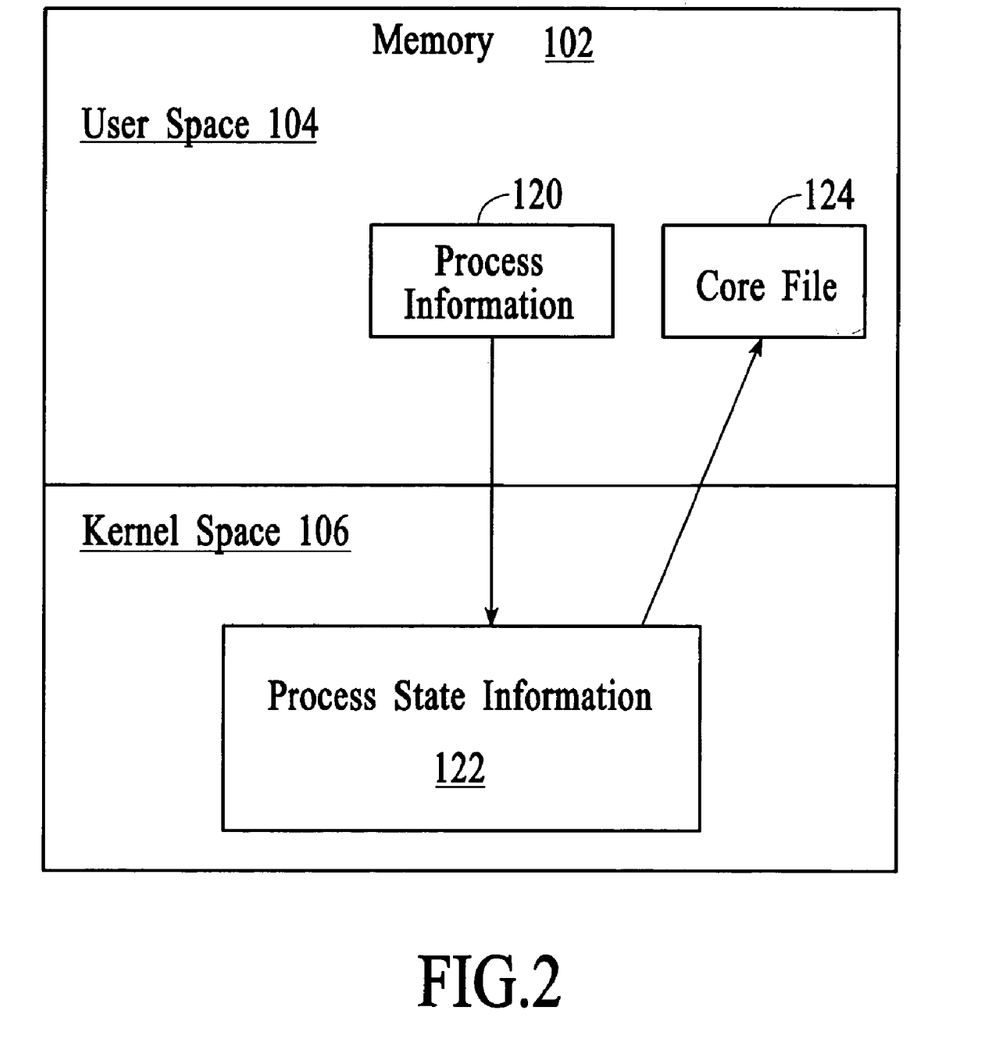
FIG. 2 graphically depicts process information, process state information, and a core file relative to the user space and the kernel space of the memory from FIG. 1.

FIG. 2 graphically depicts process information 120, process state information 122, and a core file 124 relative to the user space 104 and the kernel space 106 of the memory 102. In particular, FIG. 2 illustrates that process information at the user level leads to process state information at the kernel level and process state information at the kernel level is used to form the core file at the user level. FIG. 2 also illustrates that the core file is not generated at the kernel level and stored immediately in local permanent memory as is typically the case.

Referring back to FIG. 1, the core dump application 112 may perform many different operations in the process of generating the core file from the process state information. In a first example, the core dump application compresses the process state information to generate the core file. The particular compression technique used to compress the process state information is not critical to the invention. In a second example, the core dump application controls the total amount of the process state information that is included in the core file. In a third example, the core dump application changes the order in which process state information is saved. For example, the core dump application gives priority to register and stack information so that the register and stack information is less likely to be lost if some of the process state information has to be dropped during core file generation or if the core file is truncated in a subsequent operation. In a fourth example, the core dump application extracts only certain desired information from the process state information to include in the core file. For example, the core dump application may extract only a data segment or certain user configured fields.

Figure 3:
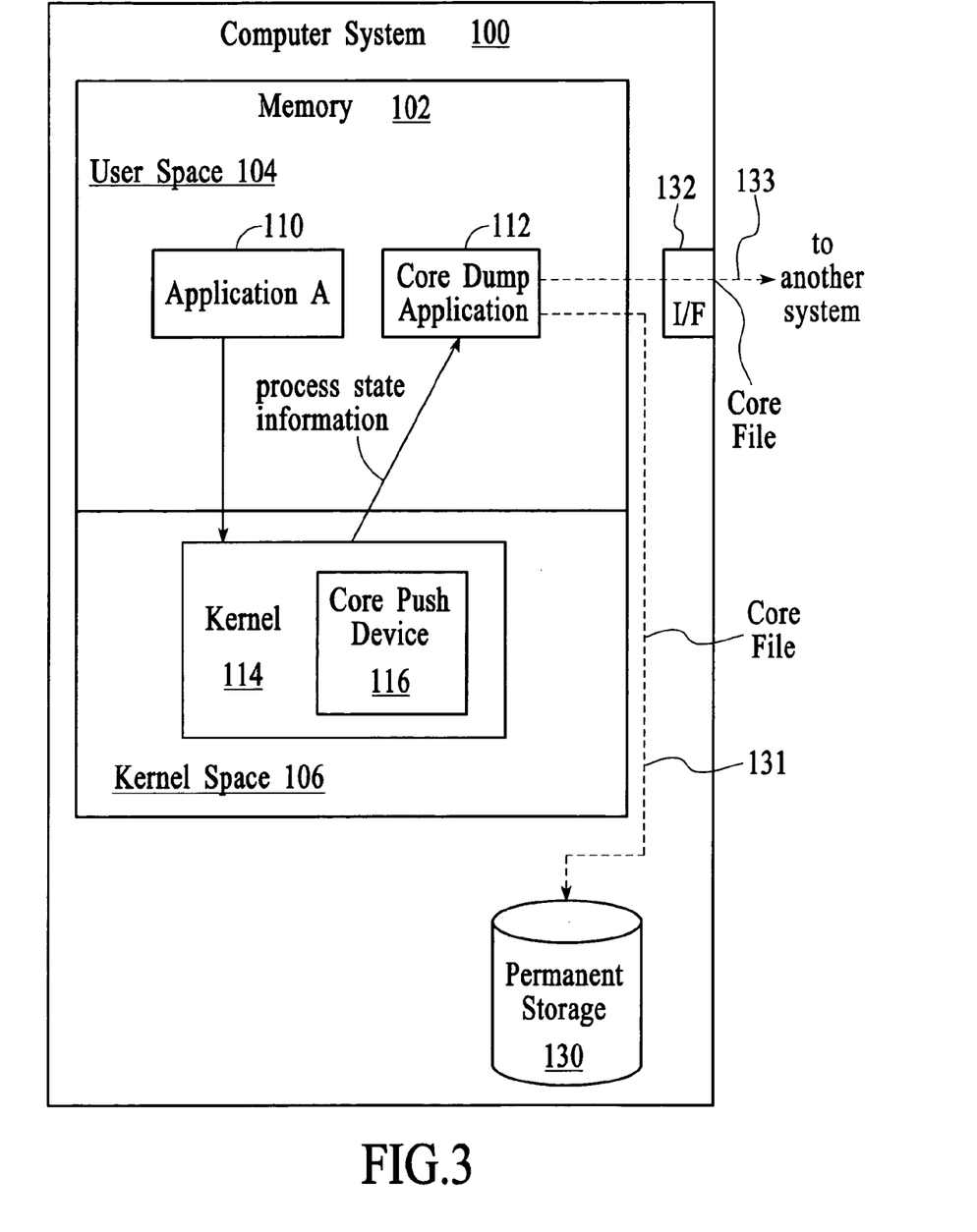
FIG. 3 graphically depicts some options for managing a core file after the core file is generated at the user level by the core dump application.

The core dump application 112 may also perform different management operations on the core file once it is generated. In a first example, the core dump application forwards the core file to another system. For example, the core file can be sent to a remote system that has available storage capacity and/or debugging capability. In a second example, the core dump application forwards the core file to a local storage device, which may include volatile memory or a permanent storage device. FIG. 3 graphically depicts some options for managing the core file after it is generated at the user level by the core dump application 112. The computer system depicted in FIG. 3 includes a local permanent storage device 130 and an interface (I/F) 132. The local permanent storage device enables local permanent storage of the core file as indicated by dashed line 131. The interface enables the core file to be forwarded to another computer system as indicated by dashed line 133, for example, a computer system with available permanent storage capacity and/or debugging capability. The core dump application can also forward the core file to multiple locations. Although the computer system of FIG. 3 depicts both a local permanent storage device and an interface, the computer system could include only the local permanent storage device or the interface.

The core dump application 112 may perform other operations related to management of the core file. In a first example, the core dump application identifies previously stored core files that can be deleted to make room for new core files. For example, previously stored core files can be deleted from a permanent storage device on a first in first out basis.

It should be understood that the core dump application 112 may perform any combination of the above-identified operations. The particular operations performed by the core dump application are implementation-specific.

Figure 4:
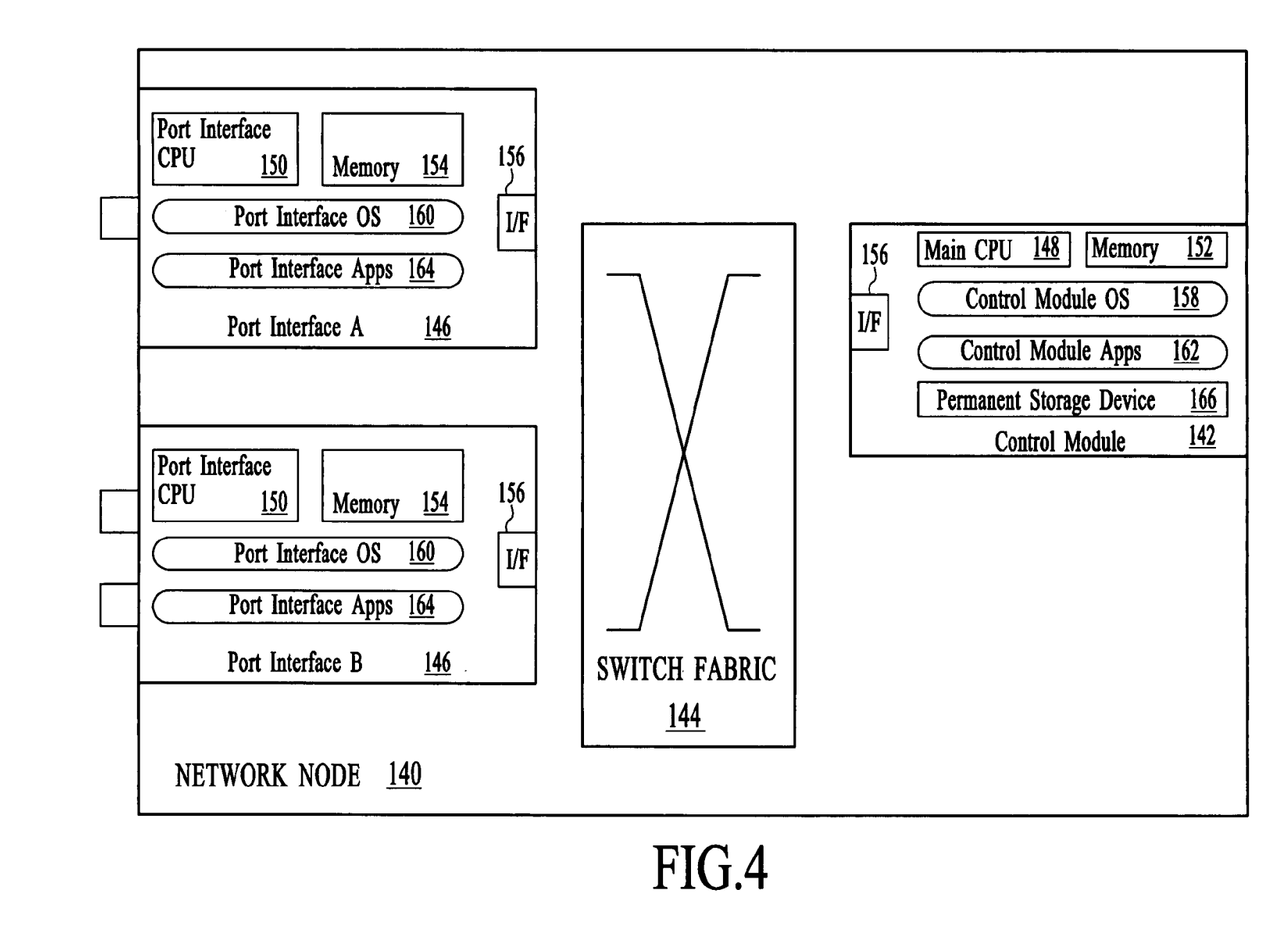
FIG. 4 depicts an exemplary network switching and/or routing device that includes a control module, a switch fabric, and two port interfaces.

In an embodiment, computer systems similar to those depicted in FIGS. 1 and 3 are elements of a network switching and/or routing device that has a distributed architecture. FIG. 4 depicts an exemplary network switching and/or routing device (referred to herein as a network node 140) that includes a control module 142, a switch fabric 144, and two port interface modules 146 (port interfaces A and B). The network node is described as having a distributed architecture because the control module and the two port interfaces each run their own independent operating systems.

The network node 140 handles traffic in discrete segments, often referred to as datagrams. In an embodiment, the network node is an Ethernet switch/router that forwards traffic within the network node using Layer 2 (L2), Layer 3 (L3), and/or Layer 4 (L4) header information, where the network "Layers" are described in the Open System Interconnection (OSI) model as defined by the International Standardization Organization (ISO). The network node may include port interfaces that support network protocols such as Ethernet, asynchronous transfer mode (ATM), synchronous optical network (SONET), and Frame Relay. Although an Ethernet-based switch/router is described, the disclosed techniques for generating and managing a core file can be applied to any network node that utilizes a distributed architecture.

Referring to FIG. 4, the control module 142 of the network node 140 supports various functions such as network management functions and protocol implementation functions. Example functions that are performed by the control module include implementing configuration commands, providing timing control, distributing operating system and application software code, programming hardware tables, providing system information, supporting a user interface, managing hardware changes, and bus management. The switch fabric 144 provides datapaths between the control module and the port interfaces 146 (e.g., control module to port interface datapaths and port interface to port interface datapaths). The switch fabric may include, for example, shared memory, shared bus, and crosspoint matrices. The port interfaces perform functions such as receiving traffic into the network node, buffering traffic, making forwarding decisions, and transmitting traffic from the network node. The port interfaces include one or more ports that support connections to other network nodes.

The control module 142 and port interfaces 146 are independent computer systems that include their own central processing unit (CPU) 148 and 150, memory 152 and 154, interface (I/F) 156, operating system 158 and 160, and applications 162 and 164. The CPU within each independent computer system may include a multifunction processor and/or an application-specific processor. Examples of processors include the PowerPC™ family of processors by IBM and the x86 family of processors by Intel. The memory within the control module may include read only memory (ROM), flash memory, and RAM. The control module includes a large capacity permanent storage device 166 such as a hard disk drive. Because the port interfaces do not include a permanent storage device similar to the control module, their storage capacity is much less than that of the control module.

The interfaces 156 of the control module 142 and port interfaces 146 enable the control module and port interfaces to communicate with each other. In an embodiment, the control module and port interfaces communicate with each other over a backplane (not shown).

The operating systems 158 and 160 of the control module 142 and port interfaces 146 provide a bridge between the CPU, memory, and applications of the respective modules. Examples of operating systems that are used in network nodes with distributed architectures include well-known operating systems such as NetBSD, Linux, and vxWORKS. Although not shown, the CPUs and operating systems may be supported by other hardware (e.g., content addressable memory (CAM) and application-specific integrated circuits (ASICs)).

The applications 162 and 164 that reside on the independent computer systems (i.e., the control module 142 and port interfaces 146) are software-based applications that perform various tasks required of the network node 140. Example applications that are loaded onto the independent computer systems of the network node include, but are not limited to, L2 protocols, such as L2 Learning, virtual local area network (VLAN) management, spanning tree protocol (STP), and link aggregation control protocol (LACP) and L3 protocols such as open shortest path first (OSPF), border gateway protocol (BGP), intermediate system-to-intermediate system (ISIS), and multiprotocol label switching (MPLS). Although the CPUs 148 and 150, memory 152 and 154, operating systems 158 and 160, and applications 162 and 164 of each module are depicted in FIG. 4 as separate functional units for description purposes, these functional units are operatively and functionally integrated as is known in the field. Additionally, although some examples of CPUs, memory, operating systems, and applications are provided, these examples in no way are meant to be exhaustive lists.

Figure 5:
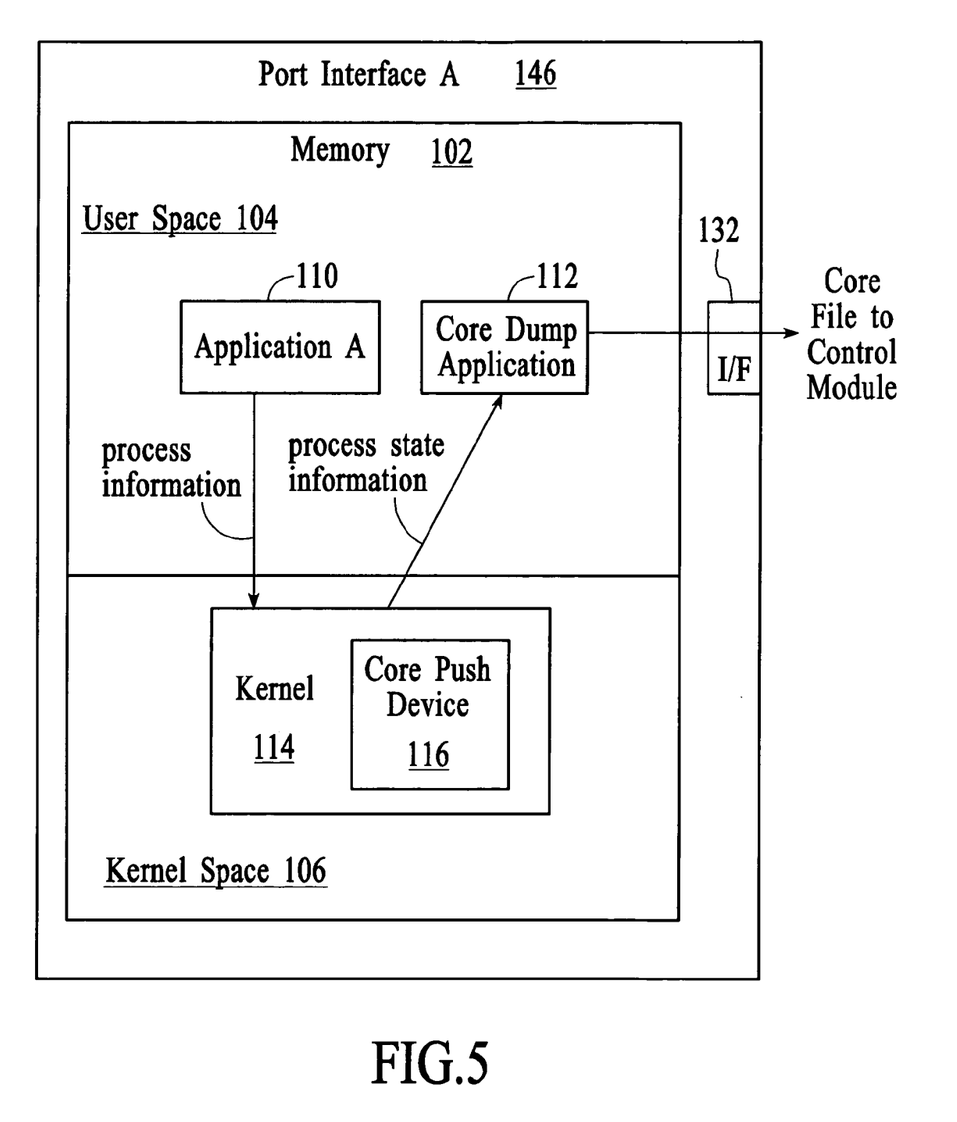
FIG. 5 graphically depicts a core file being forwarded from a port interface to the control module of FIG. 4.

As described above, the port interfaces 146 of the network node 140 have only low capacity memory (e.g., ROM, flash memory, and RAM) and no permanent storage device. However, because the port interfaces are independent computer systems with functioning operating systems 160 and applications 164, there are bound to be application crashes. In the event of an application crash, it is desirable to be able to save a core file for debugging. In accordance with an embodiment of the invention and as depicted in FIG. 5, the port interfaces of the network node are configured with a core push device 116 at the kernel level and a core dump application 112 at the user level. The core push device and the core dump application are similar to those described above with reference to FIGS. 1–3. In response to a fault condition during the execution of an application (i.e., an application crash), the core push device of the port interface pushes process state information up to the user space 104 and the core dump application generates a core file from the pushed process state information. The core file is then forwarded to the control module 142 (FIG. 4) where it can be stored in the permanent storage device 166. From the permanent storage device of the control module, the core file can be held and used for debugging. A copy of the core file can be forwarded from the network node 140 to a remote computer system for aggregation and/or debugging. Core files can be sent to a remote computer system through one of the port interfaces as packetized data similar to other data that is communicated through the network node. In one embodiment, the control module automatically forwards core files to a designated remote computer system. In another embodiment, core files are accessed by a remote computer as needed. For example, a system administrator can gain access to stored core files as necessary through a remote system administration application.

In an embodiment, the network node of FIG. 4 is a chassis-based network node in which the control module, switch fabric, and port interfaces are individually removable modules.

Figure 6:
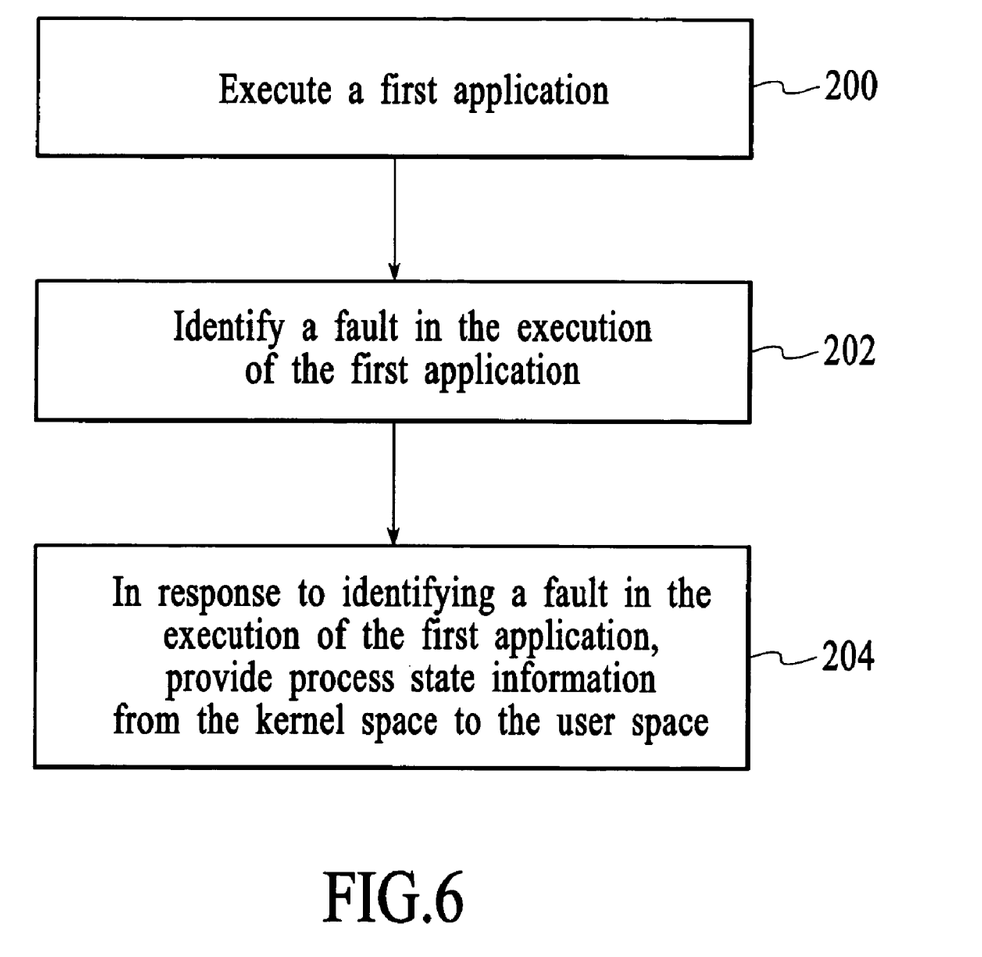
FIG. 6 depicts a process flow diagram of a method for managing process state information.

FIG. 6 depicts a process flow diagram of a method for managing process state information in an operating system environment where memory used by an operating system is segregated into kernel space and user space. At block 200, a first application is executed. At block 202, a fault in the execution of the first application is identified. At block 204, in response to identifying a fault in the execution of the first application, process state information is provided from the kernel space to the user space.

Although specific embodiments of the invention have been described and illustrated, the invention is not to be limited to the specific forms or arrangements of parts as described and illustrated herein. The invention is limited only by the claims.

What is claimed is:

1. A system for managing process state information in an operating system environment, wherein local memory used by an operating system is segregated into kernel space and user space, the system comprising:
   a kernel that includes a core push device;
   a first application; and
   a core dump application;
   wherein;
      the first application uses the user space of the local memory and is configured to provide some functionality upon execution;
      the core push device uses the kernel space of the local memory and is configured to provide process state information from the kernel space of the local memory to the user space of the local memory in response to a fault condition related to execution of the first application; and
      the core dump application uses the user space of the local memory and is configured to generate a core file from the process state information that is provided from the kernel space of the local memory to the user space of the local memory;
      wherein the kernel, the first application, and the core dump application are loaded on a first module of a network node and wherein the core dump application is further configured to forward the core file to a second module of the network node.

2. The system of claim 1 wherein the process state information is provided from the kernel space of the local memory directly to the user space of the local memory.

3. The system of claim 1 wherein the first and second modules are removable modules of a chassis-based network node.

4. The system of claim 1 wherein the core push device is kernel level software code.

5. The system of claim 1 wherein the core dump application is user level software code.

6. The system of claim 1 wherein the core push device is kernel level software code and wherein the core dump application is user level software code.

7. A method for managing process state information in an operating system environment, wherein local memory used by an operating system is segregated into kernel space and user space, the method comprising:
   executing a first application;
   identifying a fault in the execution of the first application;
   in response to identifying a fault in the execution of the first application, providing process state information from the kernel space of the local memory to the user space of the local memory;
   wherein providing process state information from the kernel space of the local memory to the user space of the local memory comprises providing process state information to a core dump application and further comprising generating a core file in the user space of the local memory from the process state information that is provided to the user space; and
   forwarding the core file from the user space of the local memory to a remote system.

8. The method of claim 7 wherein the process state information is provided directly to the user space of the local memory.

9. The method of claim 7 wherein generating the core file comprises compressing the process state information.

10. The method of claim 7 wherein generating the core file comprises extracting desired pieces of the process state information.

11. The method of claim 7 wherein generating the core file comprises changing the order of the process state information.

12. A method for managing process state information in a network node that has a distributed architecture with multiple modules that run independent operating systems, wherein memory used by each of the independent operating systems is segregated into kernel space and user space and wherein a kernel operates at the kernel level and applications operate at the user level, the method comprising:
   identifying a fault in the execution of a first application at a first module;
   in response to identifying a fault in the execution of the first application and at the first module, providing process state, information from the kernel space to the user space;
   at the first module, generating a core file at the user level from the process state information that is provided to the user space;
   forwarding the core file from the user space of the first module to a second module; and
   storing the core file in a permanent storage device at the second module.

13. The method of claim 12 wherein the process state information is provided directly to the user space.

14. The method of claim 12 wherein providing process state information from the kernel space to the user space comprises providing process state information to a core dump application.

* * * * *